2,792,305
Patented May 14, 1957

2,792,305
PROCESSING OF CURED MEATS

Robert H. Harper, Forest Park, Ill., assignor to Swift & Company, Chicago, Ill., a corporation of Illinois No Drawing. Application August 6, 1953,
Serial No. 372,821

1 Claim. (Cl. 99—109)

The present invention relates to the refurbishment of certain cured meats to effect an improvement in color and texture. The process of the invention is particularly adapted for the color restoration and texture improvement of Genoa-type salami and other uncooked, cured meats.

In the manufacture of Genoa salami, comminuted meat packed in a natural casing is held in a drying room at a temperature within the range of 45–50° F. for a period of time sufficient to kill any trichinae that may be present in the meat. Government regulations require that the sausage be retained in the drying room for varying periods of time, depending on the particular product and the dimension of the sausage. Periods of 40–60 days are frequently required, and it is conventional practice among many meat packers to actually hold the meat for periods even longer than that required by government regulations. Frequently, the product after drying for this period of time has an off-color which is unacceptable to the trade, and occasionally there is a drying out of the sausage (known as "shelling") which results in the formation of an objectionable hard shell. Sausages developing this off-color and "shelling" are degraded and sold at a discount. Through the practice of my invention the color and, where necessary, the texture of such degraded product may be vastly improved.

I have found that color restoration may be brought about and the texture of certain cured meats improved by maintaining a substantial air- and moisture-impermeable barrier around the meat for a period of time sufficient to permit substantial equalization of moisture and reducing agents throughout the meat and of sufficient duration for the redistributed components to act upon the met pigments present to substantially restore the desirable cured color.

My method is not generally applicable to the refurbishing of all discolored meats; for example, discolored fresh meats will spoil before refurbishment can be accomplished. Cured cooked meats in general cannot be restored because their off-color denatured pigments are irreversible.

The period of time required for refurbishing depends principally upon the degree of discoloration and the rate at which moisture redistribution is accomplished. Through moisture redistribution the natural reducing agents of the meat are brought into contact with the brown met pigments of the discolored or dull areas to being about the return of the red cured color of nitric oxide hemoglobin and nitric oxide myoglobin. Refurbishment of whole pieces of badly discolored Genoa-type sausage of standard age (sausage which has been dried for 70–90 days) may be accomplished usually within a period of six to ten weeks.

The cured pigments and texture of an off-colored sliced product cannot be restored to its full original cured color and earlier texture. Probably the reason for this is the inadequate supply of the natural reducing agents present in a thin slice after exposure to atmospheric oxygen. In one test a vacuum-packaged sliced product was observed for longer than ten weeks and at the end of that period the color improvement was only slight and not commercially acceptacle.

Several methods of refurbishing have been successfully employed. Among these have been vacuum packaging, wrappage of the product with substantially air- and moisture-impermeable film, sealing of the product in jars, and wax coating to exclude air and forestall evaporation of moisture from the product being refurbished.

The following examples illustrate the effectiveness of the previously described methods. In the first four examples, chunks of discolored Genoa sausage (manufactured solely from pork trimmings) of substantially equal discoloration and with the same degree of shelling were used. In each example the hard shell of the meat softened to improve considerably the texture by the end of the period required for the color restoration.

Example I

A chunk of the badly discolored Genoa sausage was wrapped in a Saran film bag, having an appropriate composition of 73 percent vinylidene chloride and 27 percent vinyl chloride. A vacuum was drawn on the bag to remove the atmospheric air, and the vacuumized bag stored under refrigeration at a temperature within the range of 40°–45° F. In approximately six weeks, the brown met pigments disappeared and a fully acceptable cured color was obtained.

Example II

In this example a second chunk of the sausage was blanketed with nitrogen in a closed glass jar and held at a temperature in the range of 40°–45° F. A satisfactory color was restored at the end of sixty days.

Example III

A third chunk of the Genoa sausage was coated with a cheese wax and again refrigerated at a temperature within the range of 40°–45° F. A period of sixty days was required to restore an acceptable cured color. The cheese wax employed had a composition of 50 percent paraffin wax with a melting point in the range of approximately 135–165° F. and 50 percent crystalline wax having a melting point in the range of approximately 120–130° F. The waxy compositions described in United States Patent No. 2,299,951, Ingle, may be used satisfactorily in my process.

Example IV

In a fourth instance, a chunk of Genoa sausage was packaged in a substantially air- and moisture-impermeable film of the same composition as used in Example I. There was no drawing of a vacuum to remove air. A satisfactory cured color was returned in approximately sixty days upon storage at a temperature within the range of 40°–45° F.

It will be appreciated that the length of time required to refurbish a cured meat will vary, depending on the degree of discoloration, the degree of shelling, if any, the moisture content of the cured meat, the amount of natural reducing agents present, the holding temperature, and other factors.

Example V

In this example a badly discolored chunk of a Genoa-type salami containing approximately 75 percent pork and 25 percent beef was packaged in a film bag of the composition described in Example I. The bag was vacuumized and refrigerated at a temperature in the range of 40°–45° F. A satisfactory cured color was restored in approximately six weeks.

Obviously, many modifications and variations of the invention as hereinbefore set forth may be made without departing from the spirit and scope thereof, and therefore only such limitations should be imposed as are indicated in the appended claim.

I claim:

In the treatment of a discolored Genoa type salami to improve the cured color and texture thereof, said salami having become discolored and attaining a dried shelled condition as a result of the conventional preparation thereof, the step comprising enclosing the dried product in an air and moisture impermeable enclosure, and storing the enclosed product at a temperature of 40–45° F. for a period of time sufficient to permit the redistribution of the moisture content of the salami and of the natural reducing agents contained therein to restore the cured color to said product, said time period being of at least six weeks.

References Cited in the file of this patent

UNITED STATES PATENTS

| | | |
|---|---|---|
| 2,262,238 | Kellerman | Nov. 11, 1941 |
| 2,337,666 | Koonz et al. | Dec. 28, 1943 |
| 2,621,129 | Ramsbottom et al. | Dec. 9, 1952 |
| 2,623,826 | Grinstead | Dec. 30, 1952 |

OTHER REFERENCES

"Food Research," November 1948, page 432 to 439, inclusive, article entitled Controlling Quality Changes in Cured Meats by Packaging.

"Modern Packaging," September 1950, page 93, 94, and 95, article entitled Conforming Tight Wraps.